US008789617B2

(12) United States Patent
Konecník

(10) Patent No.: US 8,789,617 B2
(45) Date of Patent: Jul. 29, 2014

(54) HYDRAULIC PICK

(75) Inventor: Stefan Konecník, Nová Dubnica (SK)

(73) Assignee: KONEK s.r.o., Nová Dubnica (SK)

( * ) Notice: Subject to any disclaimer, the term of this patent is extended or adjusted under 35 U.S.C. 154(b) by 277 days.

(21) Appl. No.: 12/668,565

(22) PCT Filed: Jul. 8, 2008

(86) PCT No.: PCT/SK2008/000008
§ 371 (c)(1),
(2), (4) Date: Jan. 11, 2010

(87) PCT Pub. No.: WO2009/008844
PCT Pub. Date: Jan. 15, 2009

(65) Prior Publication Data

US 2010/0193212 A1 Aug. 5, 2010

(30) Foreign Application Priority Data

Jul. 9, 2007 (SK) ...................................... 93-2007

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***E21B 1/00*** | (2006.01) |

(52) U.S. Cl.
USPC .......................................................... 173/138

(58) Field of Classification Search
USPC ....................... 173/20, 218–220, 90–91, 200, 173/135–138, 73, 206, 168; 251/210, 56
See application file for complete search history.

(56) References Cited

U.S. PATENT DOCUMENTS

| | | | | |
|---|---|---|---|---|
| 1,629,035 A | | 5/1927 | Katterjohn | |
| 3,616,865 A | | 11/1971 | Sudnishnikov et al. | |
| 3,727,701 A | | 4/1973 | Sudnishnikov et al. | |
| 4,133,393 A | * | 1/1979 | Richards | 173/64 |
| 4,833,780 A | * | 5/1989 | Pollock | 30/368 |
| 5,038,874 A | * | 8/1991 | Larsson et al. | 175/322 |

(Continued)

FOREIGN PATENT DOCUMENTS

| | | | | |
|---|---|---|---|---|
| GB | 328235 A | | 4/1930 | |
| WO | WO 02/06014 A1 | | 1/2002 | |
| WO | WO 2009008844 A1 | * | 1/2009 | B25D 9/20 |

OTHER PUBLICATIONS

International Search Report for PCT/SK2008/000008 completed Nov. 4, 2008.

(Continued)

*Primary Examiner* — Robert Long
(74) *Attorney, Agent, or Firm* — Buchanan Ingersoll & Rooney PC

(57) ABSTRACT

A hydraulic pick has a supporting body with a piston and a piston rod fixedly positioned in the supporting body. A working tool is driven by a short, axially rigid striking pin, guided in a bushing. A pressure transformer cylinder and an equalizing chamber are formed between the piston rod and a pressure transformer piston. The striking pin is driven by a working fluid under pressure, which is distributed by a system of channels in the piston rod.

11 Claims, 3 Drawing Sheets

(56) References Cited

U.S. PATENT DOCUMENTS

| | | | | |
|---|---|---|---|---|
| 5,080,181 | A * | 1/1992 | Tatsuno | 173/93.5 |
| 5,113,950 | A | 5/1992 | Krasnoff | |
| 5,662,180 | A * | 9/1997 | Coffman et al. | 175/57 |
| 5,957,220 | A * | 9/1999 | Coffman et al. | 173/91 |
| 6,047,778 | A * | 4/2000 | Coffman et al. | 173/91 |
| 6,206,101 | B1 * | 3/2001 | Bakke | 166/301 |
| 6,398,096 | B1 * | 6/2002 | Lang | 227/51 |
| 6,454,025 | B1 * | 9/2002 | Runquist et al. | 175/61 |
| 6,588,516 | B2 * | 7/2003 | Runquist et al. | 175/61 |
| 7,252,157 | B2 * | 8/2007 | Aoki | 173/162.2 |
| 7,370,399 | B2 * | 5/2008 | Lang et al. | 29/432 |
| 7,469,751 | B2 * | 12/2008 | Gien | 173/15 |
| 7,475,473 | B2 * | 1/2009 | Lang et al. | 29/798 |
| 7,614,452 | B2 * | 11/2009 | Kenison et al. | 166/321 |
| 7,617,889 | B2 * | 11/2009 | Beccu | 175/296 |
| 7,721,405 | B2 * | 5/2010 | Lang et al. | 29/505 |
| 2004/0050243 | A1 * | 3/2004 | Piras | 91/327 |
| 2006/0076154 | A1 * | 4/2006 | Aoki | 173/212 |
| 2007/0251710 | A1 * | 11/2007 | Lim | 173/109 |

OTHER PUBLICATIONS

Written Opinion for PCT/SK2008/000008 completed Nov. 4, 2008.

International Preliminary Report on Patentability for PCT/SK2008/000008 completed Jan. 10, 2009.

* cited by examiner

HYDRAULIC PICK

The solution concerns a hydraulic pick that has a stroke which is driven by a pressurized liquid. An impulse element hammers a working tool such as a cutter in the hydraulic pick.

STATE-OF-THE-ART

Known solutions are based on a hydraulic steering of a striking pin which has the shape of a piston rod. The piston rod has an increased diameter in a middle part which forms a slightly sealed piston by reason of a gap in the cylinder. Because the striking pin is static after the piston contacts the cylinder, this gap has to be sufficiently large which causes large flow losses. This has the biggest influence on a decrease in efficiency of picks in the present world production. An inlet of pressurized oil is led into the cylinder's working chambers through a supporting housing by channels that decrease the effectiveness of the picks because of their hydraulic resistance, especially by the movement of the striking pin into a stroke. An impulse for switching a switching element in an upper position is obtained from a control channel in the cylinder. This channel does not enable a sealing of the striking pin's piston by a cup. Therefore, the diameter of the striking pin is as small as possible. But a required weight increases the length of the striking pin. This results in a decrease of an axial strength and of a strength of the stroke by the same achieved speed.

Supporting housings of picks are, for assembling reasons and also because of absorption of no-load strokes, (for absorption of residual energy after a sudden penetration through a barrier), designed from more parts, and joined by long screws that are by their elasticity decreasing destructive impacts on a bottom part of the pick and on an outrigger of an industrial machine. These screws are stressed to such extent that not only plastic deformation of nuts results, but also a breakage of the screws themselves. The plastic deformation of the nuts and screws is eliminated in operation by continuously retightening the nuts. The residual energy of the working tool is absorbed by a cross pin and damages the pin itself. A diminished shaft of the working tool causes its breakage.

A working tool is placed in a bottom part of the pick in thermally hardened steel cases. This results in seizing of the placement with a progressive increase in a tolerance of the placement. The result is a penetration of dust and impurities into its placement and also, last but not least, an origination of an eccentric stroke of the striking pin to the head of the tool. For work under water, compressed air is supplied into the area of the tool's placement. Nowadays, this problem is solved by a flexible placement by oil from an industrial machine.

A compressive force of an industrial machine to a pick is transferred by a working tool to the pick's part by an annulus surface which arose by decreasing the tool head's diameter. But that damps the tool's head, and is usually the reason for its hammering or abruption.

Picks are mechanically protected by their placement into other case which will be fixed by an adapter to an industrial machine. There are known solutions, where in order to decrease a negative impact on an industrial machine, the pick is placed into a box flexibly or is construed in such way that no-load strokes will be prevented. This concept works with a permanent leakage flow and by a run of function of this member the pressure in the hydraulic system will be increased to a value of safety pressure which has a negative impact on the whole hydraulic system by contemporary overheating of the working liquid. In other known solutions, the box is embedded by a sound baffle material, to decrease an outer noise level of the pick.

Common features of picks from worldwide production are their big technological severity, weight, dimensionality and sensitivity to rough handling.

SUBJECT MATTER OF THE INVENTION

The above-mentioned negatives are overcome by a solution comprising an inverse concept where a striking pin is a cylinder which is placed on a piston rod that is firmly connected with a supporting housing. The striking pin is controlled by a hydraulic flip-flop circuit that reacts only to both extreme positions of the striking pin. A switching element, which is placed in the piston rod, switches the direction of a flow of a pressure working liquid with high speed. In the case of a working tool which is in an extra-work position, the pressure of the liquid in the system will be decreased, which will cause an interruption of the pick's function functioning. No-load strokes do not result and the working liquid is not overheated.

A high pressure accumulator, which is used in other picks, is here replaced by a pressure transformer with a cylinder and a piston. The piston has on one side, a low pressure gas chamber, shared with the striking pin and on another side, an equalizing chamber that is connected with a gas chamber only in a starting position. The pressure transformer's cylinder is connected to an inlet of pressure working liquid and as a result of a parallel movement of the pressure transformer's piston with the striking pin, secures an almost constant pressure in the hydraulic system and by its regulated damping in dependence on flow, also removes vibrations from the movement of the striking pin.

The basis of the hydraulic pick according to the invention consists in the fact that in an upper part of a rotary or round supporting housing, the piston rod with the piston are immovably placed, on which is slipped-on the piston of the pressure transformer, a movable valve ring and the striking pin, loaded into a bushing placed in an inner wall of the supporting housing. In the piston rod body is created a continuous inlet channel with taps, terminated by a control channel and a continuous return duct with a tap, through which flows the pressure working liquid. In the piston rod other holes are also provided from a surface to a control channel, in which is placed the switching element with a pan construction. A valve ring provided with an inner relief, is slipped-on the piston rod by its lower side in the area of its decreased diameter. An upper side of the valve ring is slipped-on the body of the piston rod with a non-reduced diameter. A first channel flows into a cavity in the ring, which arose by its relief, from a control channel.

The working tool is inserted into the supporting housing from the other, lower side, which working tool is provided in a bushing in such a way, that the working tool slides easily without sticking. An outer side of the bushing is protected against the working environment, and is sealed and closed by a cover. A short solid striking pin evokes an increased strength of stroke, and thus the diameter of the working tool's head is inversely increased. The tool does not have any damping for a safety pin. The new shape of the tool is resistant against breakage.

The pick allows work under water without a need for an inlet of compressed air. In case of a sudden penetration through a barrier, the tool is axially spring-loaded. The pick is equipped against an origination of no-load strokes by a safety circuit, which contrary to known solutions will not increase the pressure in the hydraulic system up to a value of safety pressure, if the striking pin will come to an extra-work position, but on the contrary, the pressure will be decreased, whereby the function of the pick will be immediately interrupted. A controlling hydraulic flip-flop circuit is switched by full speed, and in extreme positions is hydraulically braked and is not the function of hydraulic resistances.

A very toilsome noise damping of a pick, which until now was realized on the pick's surface by its placement into a box, is brought forward into the pick, directly to the source of acoustic performance (striking pin—working tool). Other advantages are small dimensions and less than half of weight in comparison with known picks, which extends its usage to a larger ranger of industrial machines. The pick does not contain screw connections. The parts of the pick are, after their assembly into bulk connected by sufficiently big forces, activated by the pressure of filling gas, usually by nitrogen. The pick does not require any maintenance. Greasing of the working tool's bushings is automatic from a low pressure return tap.

BRIEF DESCRIPTION OF THE DRAWING FIGURES

DETAILED DESCRIPTION OF THE PREFERRED EMBODIMENTS

Figure 1:
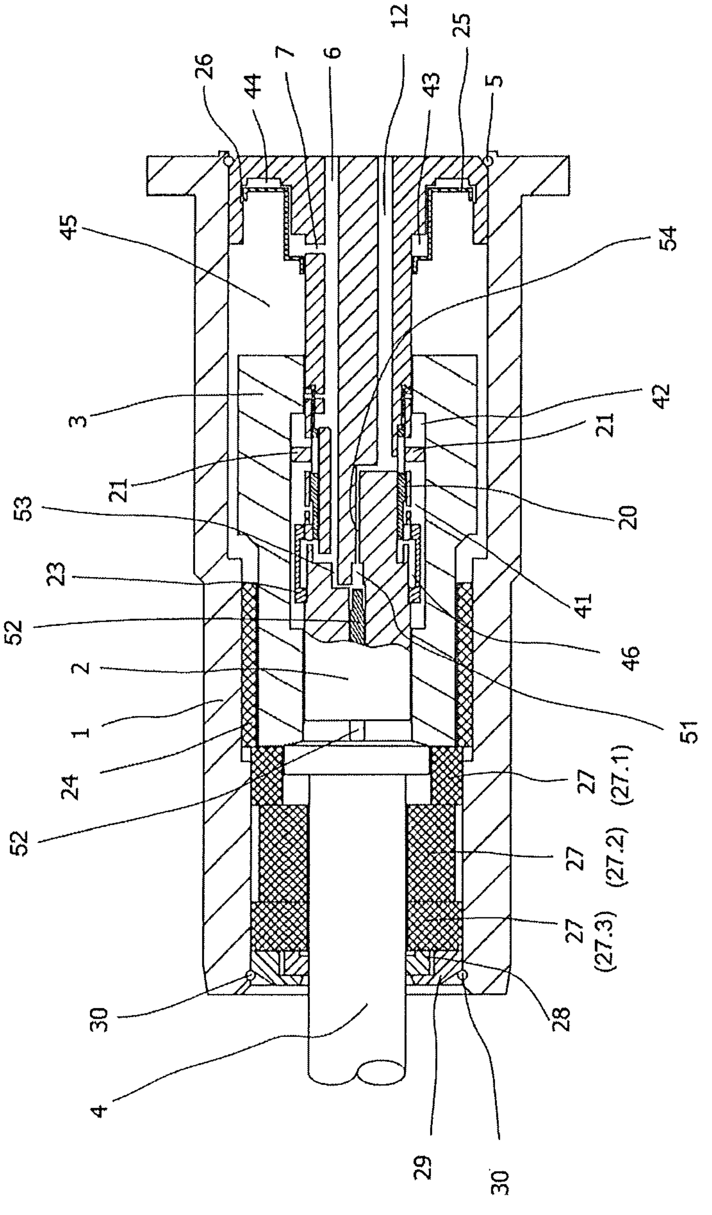
FIG. 1 is a schematic representation of a hydraulic pick from a first example of realization in longitudinal section.
Figure 2:
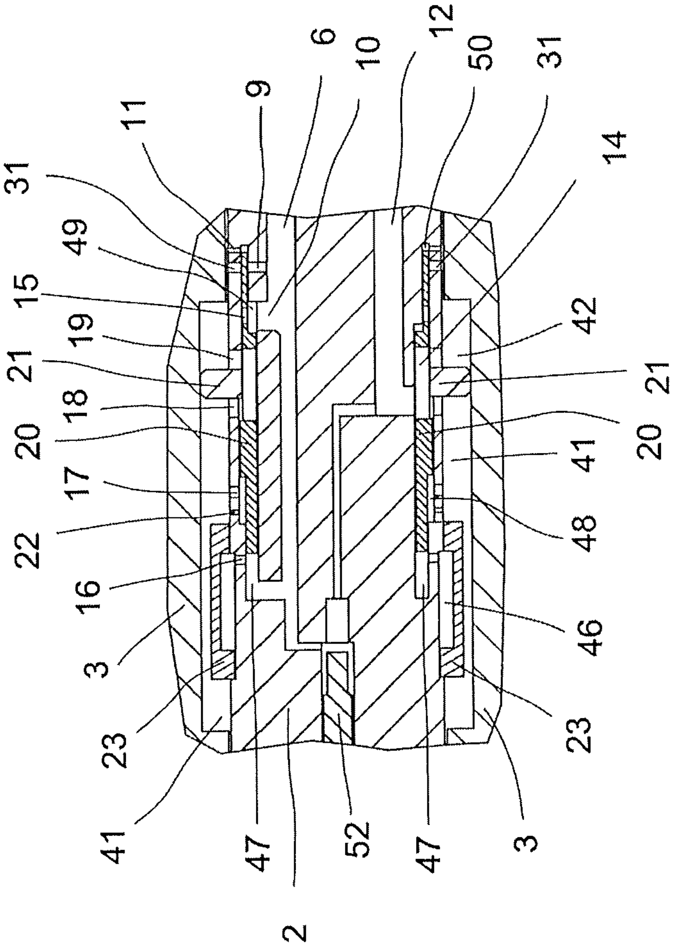
FIG. 2 is a magnified detail of a section of a control mechanism from FIG. 1.
Figure 3:
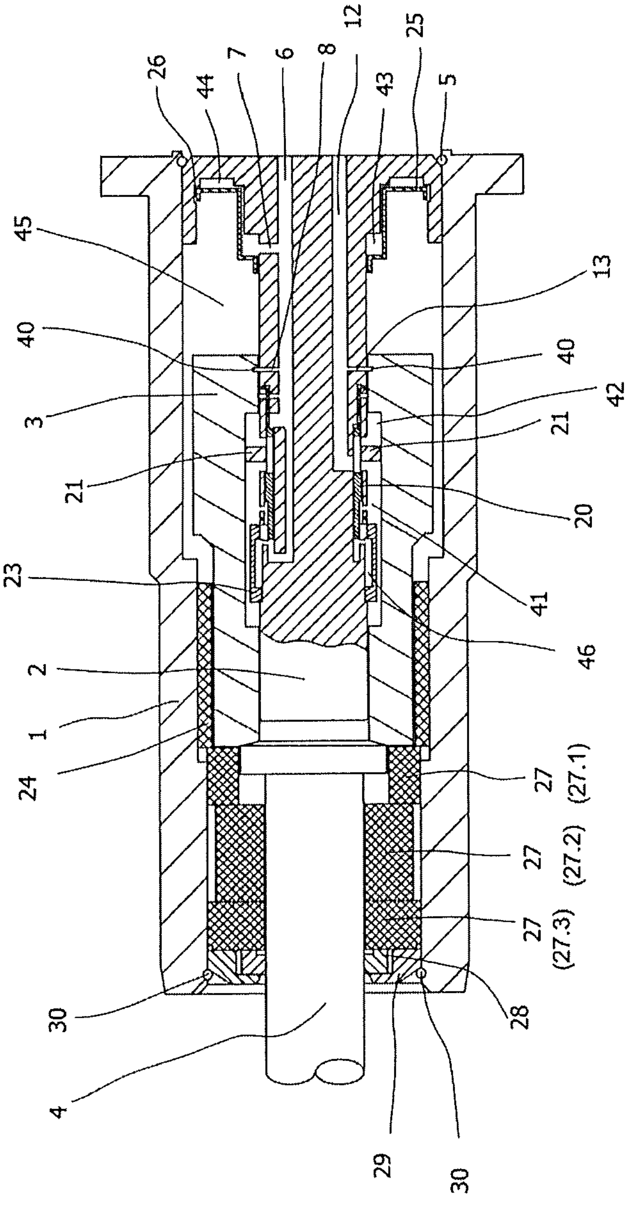
FIG. 3 is a schematic representation of a pick in longitudinal section with other security circuit according to a second example of realization.

A hydraulic pick is assembled from four main parts that are: a monolithic rotary or round supporting housing 1, a piston rod 2, a striking pin 3 and a working tool 4. In the supporting housing 1, the piston rod 2 is non-movable or fixedly provided, and secured against protrusion by a safety ring 5. On the piston rod 2, the movable striking pin 3 is slipped-on, executed as a round body, which has been axially bored according to the diameter of the piston rod 2, with a relief or an inner removal of material which forms a cavity, which cavity is after the striking pin is slipped on the piston rod 2, is divided by a sealing piston 21 into a first chamber 41 and a second chamber 42.

In the area of the first chamber 41, the piston rod 2, has in one part, a decreased outer diameter. In this area, a valve ring 23 is slipped-on the piston rod 2. The length of the valve ring 23 is longer than the length of the segment, on which the piston rod 2 has the decreased outer diameter. The valve ring 23, is adapted to this situation in such a way, that on the side which is closer to the piston 21, the valve ring 23 has an axial hole which is equivalent to the diameter of the piston rod 2 in its non-tapered part. On an opposed end, the valve ring 23 has an axial hole which is equivalent to the diameter of the piston rod 2 in its tapered part. Between both terminal faces, the valve ring 23 has an inside relief, by which is, after the valve ring 23 is slipped-on the piston rod 2, created between those two bodies a cavity 46 in the ring.

In the piston rod 2, a continuous inlet channel 6 with a first tap 7, a third tap 9 and a fourth tap 10 is created. A next space with an inserted light switching element 20 with pan construction is connected to the end of the inlet channel 6. The switching element 20 is executed in a ring shape with graduated outer and inner diameters in such a way that an overall surface of its bottom (on the left side in the figures) faces is bigger than a surface of its upper (on the right in the figures) faces. In the switching element 20, is executed a duct 14 which communicates with another duct 15.

After the insertion of the switching element 20, four cavities are created in the next space: a lower cavity 47, a small cavity 48, a middle cavity 49 and an upper cavity 50. The lower cavity 47 is connected with the cavity 46 in the ring by a first channel 16. The small cavity 48 is connected with the surface of the piston rod 2 in the first chamber 41 by a lower nozzle 22 and a second channel 17. The fourth tap 10 of the inlet channel 6 is loaded into the middle cavity 49.

The duct 15 of the switching element 20 is connected with the middle cavity 49. The upper cavity 50 is connected with the inlet channel 6 through the third tap 9 and the upper cavity 50 is connected with a fifth channel 31 and an upper nozzle 11 with the surface of the piston rod 2. A channel is created on both sides of the piston 21 from the surface of the piston rod 2 to the switching element 20: from the first chamber 41 there is a third channel 18, from the second chamber 42 there is a fourth channel 19. Through the third channel 18 and the duct 14, the first chamber 41 is permanently connected with a return duct or outlet 12, created in the piston rod 2.

The striking pin 3 is loaded into a non-metal sealed axially sliding bushing 24, which has been slipped-on into the supporting housing 1. A low-weight pressure transformer is further assembled in an upper (right) part of the piston rod 2, by a connection of a bell piston 25 (a pressure transformer's piston 25), a sealed cylinder 43 (a pressure transformer's cylinder 43) and an equalizing chamber 44 in such a way, that the cylinder 43 is made of the walls of the pressure transformer's piston 25 and the piston rod 2 and is connected to the first tap 7 of the inlet channel 6. The sealed equalizing chamber 44 is created between the piston 25 and the cover of the piston rod 2.

A gas chamber 45 is created in the area delimited by the supporting housing 1, the bushing 24, the striking pin 3, the piston rod 2 and the pressure transformer's piston 25. In a basic position of the pressure transformer's piston 25, the equalizing chamber 44 is interconnected with the gas chamber 45 by a connecting channel 26. The working tool 4 is placed in the supporting housing 1 through a non-metal tool bushing 27 that is, in this example of realization, made as three-pieces 27.1, 27.2, and 27.3, whereby its middle part consists of the spring-loading insertion 27.2. The tool bushing 27 is sealed against the tool 4 by a floating metal stearing ring 28 equipped by sealing, which is axially non-movable against the supporting housing 1.

A lower sealing cover 29 is secured against protrusion by a safety ring 30 with a constant preload implied by a strength of gas pressure in the gas chamber 45. Sealing of the bushings 27 against the supporting housing 1, of the bushing 24 against the supporting housing 1 the and striking pin 3, of the striking pin 3 against the piston rod 2, of the piston 21 against the striking pin 3, of the pressure transformer's piston 25 against the piston rod 2 and the piston rod 2 against the supporting housing 1 is achieved by non-drawn sealing cups. The hydraulic pick described in this example of realization is built-up without screw connections.

The pick is equipped with a safety circuit made by a connection of a drilling 51 with the inlet channel 6 through a first safety channel 53 and with the return duct 12 through a second safety channel 54. The drilling 51 is made from a bottom face of the piston rod 2 into its inner space in the direction of the longitudinal axis of the piston rod 2 and a movable carpel 52 is inserted into it.

Gas is pushed into the gas chamber 45 before usage of the hydraulic pick to a needed pressure through a non-drawn channel and a cap in the piston rod 2. The compressed gas pushes out the striking pin 3 into a position, where it leans against the tool bushing 27. By this movement, the head of the working tool 4 is deferred from the face of the piston rod 2. The body of the striking pin 3 will cover the upper nozzle 11 and the fifth channel 31. The working liquid acts on the bottom of the drilling 51 by applying pressure to the carpel 52, which pushes the carpel 52 out into permanent contact with the working tool 4.

As long as the working tool 4 is not leaned against a working object (or other barrier), the striking pin 3 will push it from the pick out to such an extent, that the carpel 52, which follows the movement of the working tool 4, will expose at its opposite end, (which until then had been by it closed), a connection of the inlet channel 6 with the return duct 12 through the first and second safety channels 53, 54. In that moment working pressure of the liquid will be lost, if there was any. In consequence of this interconnection, the pick is non-functional. By pushing the working tool 4 into the pick—by pressure of the industrial machine to the working subject—the carpel 52 will also be pushed into the piston rod 2, until the connection of the inlet channel 6 with the return duct 12 will be interrupted in the drilling 51. In the taps 7 to 10 of the inlet channel 6, the pressure will be increased.

The cavity 46 in the ring will be filled by pressure working liquid through the first channel 16 which will move the valve ring 23 into a lower (left) position up to a stop position. In this position, the small chamber 48 is connected through the lower nozzle 22 and the second channel 17 with the first chamber 41. As the first chamber 41 is permanently connected with the return duct 12, the small cavity 48 also stays without increased pressure. The pressure in the middle cavity 49 and in the upper cavity 50 will be increased through the fourth tap 10 and the third tap 9.

An unbalance of strengths will arise on the face areas of the switching element 20, which will steer the switching element 20 into a fast movement towards the lower cavity 47 and the working liquid flows from the small cavity 48 through the second channel 17 and the lower nozzle 22 into the first chamber 41. By covering the second channel 17, the pressure in the small cavity is increased, following that the switching element 20 intensively starts to brake.

Turnover of the switching element 20 will be finished with a small speed, by a discharge of the small cavity 48 into the first chamber 41 through the lower nozzle 22. During movement of the switching element 20, the filling duct 15 will connect with the fourth channel 19 and interrupt the connection of the fourth channel 19 with the duct 14 of the switching element 20. In the second chamber 42, the pressure will be increased, which will initiate the movement of the striking pin 3 towards the gas chamber 45 against gas pressure.

By a slow start of the heavy striking pin 3, the increase of pressure tip of the cylinder 43 of the light pressure transformer will be prevented, which will absorb the difference from a constant flow of the working liquid supplied by the industrial machine. The piston 25 of the pressure transformer is by that moved against the movement of the striking pin 3. After a run of the striking pin 3 to a speed corresponding with the supplied flow, the piston 25 of the pressure transformer will stop following an increase in the gas pressure in the gas chamber 45 and consequently will start to return to the original position.

The working liquid that now flows from the cylinder 43 of the pressure transformer through the first tap 7 will be added to the flow supplied by the industrial machine. By this, the speed of the striking pin 3 will be further increased. A reliable return of the pressure transformer's piston 25 into the original position assures a hydraulic damping supported by a cooperation of the equalizing chamber 44. Following that, the striking pin 3 decreases the speed continuously to the value corresponding to the flow of liquid from the industrial machine, by which it is approaching the upper turning back of the firing stroke. By this movement, the face of the striking pin 3 will be fastened in the first chamber 41 of the valve ring 23 and is drifting with it.

When the lower nozzle 22 will be connected with the cavity 46 in the ring, the valve ring 23 will be fastened by the face of the striking pin 3 in the first chamber and, by this movement, is drifting with it and the second channel 17 will cover the body of the valve ring 23, and the pressure in the small cavity 48 will be increased. Because the surface of the faces of the switching element 20 in the bottom cavity 47 and in the small cavity 48 is in total bigger than the surface of its faces in the middle cavity 49 and the upper cavity 50, even though all of the cavities are under high pressure of working liquid, the switching element 20 will move itself towards the upper cavity 50. The speed of its movement will jump to a higher value after the connection of the second channel 17 with the cavity 46 in the ring. During this movement, the second chamber 42 will be detached from the inlet channel 6 and connects to the first chamber 41 through the fourth channel 19, the duct 14 and the third channel 18.

Interconnection of the second chamber 42 with the first chamber 41 occurs by the filling of the small cavity 48 with the working liquid through the second channel 17. Intensive deceleration and braking of the switching element 20 in the upper (right) position will be made by the upper nozzle 11 after the previous closing of the fifth channel 31 by the switching element 20. After the suspension of the driving power in the second chamber 42, the movement of the striking pin 3 will be stopped in the actual direction and following the overpressure of the gas in the gas chamber 45 will turn in the opposite direction. At the same time because of the pressure impact in the cavity 46 in the ring the valve ring 23 will be returned to the left stop and will expose the second channel 17 and the lower nozzle 22, and by that the pressure in the small cavity 48 will be decreased. Low pressure is also in the upper cavity 50, because that is connected with the second chamber 42 by the fifth channel 31 and the upper nozzle 11.

Because the actuating surface of the switching element 20 in the lower cavity 47 is bigger than the actuating surface of its face in the middle cavity 49, the switching element 20 will stay in the reached position almost during the whole time of the movement of the striking pin 3 towards the working tool 4. Immediately before the stroke, when the fifth channel 31 will be covered by the striking pin 3, the pressure in the upper cavity 50 will be increased, that again starts the switching element 20 and the whole cycle begins to repeat. During movement of the striking pin 3 towards the working tool 4, any working fluid does not flow into the return duct 12, therefore the second chamber 42, the first chamber 41, the small cavity 48 and the return duct 12 are completely without pressure.

The full amount of the working liquid supplied by the industrial machine flows only into the pressure transformer's cylinder 43. Following that the pressure transformer's piston 25 moves concurrent with the striking pin 3. This results in a deceleration of a decrease in gas pressure in the gas chamber 45 and an increase in the speed of the striking pin 3. If the working tool pushes on the pick, then during the movement of the striking pin 3 into the stroke, the head of the working tool 4 leans against the bottom face of the piston rod 2, which prevents an interconnection of the inlet channel 6 with the return duct 12 through the relief 51.

After the stroke of the striking pin 3 to the head of the working tool 4, the kinetic energy from a flexible impact is transferred up to the tip of the working tool 4. In the case of a sudden penetration through a barrier, the head of the working tool hits the spring loaded insertion bushing 27.2, which continuously absorbs the residual energy of the working tool. The striking pin 3 will stay leaned against the bushing 27.1 and the operation of the pick is interrupted. A return of the pick to operation is possible only after a repeated pin down of the industrial machine to the pick through the working tool 4.

In another example of realization, a safety circuit is made from a second tap 8, which is drilled from the inlet channel 6 to the surface of the piston rod 2, a return tap 13, leads from the return duct 12 to the surface of the piston rod 2 and from a safety chamber 40, made from an inner space in the upper part of the striking pin 3. The second tap 8 and also the return tap 13 are created in one plane which is upright to the longitudinal axis of the pick. Otherwise, the pick is the same as that which is shown on the previous example.

Before usage of the hydraulic pick, gas is pressed into the gas chamber 45 to the needed pressure through the non-drawn channel and cap in the piston rod 2. The pressurized gas will push the striking pin 3 into position, in which it will lean against the bushing 27. By this movement, the head of the working tool 4 also defers from the face of the piston rod 2. The body of the striking pin 3 will cover the upper nozzle 11 and the fifth channel 31. The safety chamber 40, the second tap 8 and the return tap 13 will connect the inlet channel 6 with the return duct 12. Following this interconnection, the pick is non-functional. In this way, the hydraulic pick is safely kept in a stop position by gas pressure from a single-shot that is led into a gas chamber.

By pushing the working tool 4 into the pick, the safety chamber 40 will be also pushed from the pressure of the industrial machine to the working subject. The connection of the inlet channel 6 with the return duct 12 will be interrupted by this. In the taps 7 to 10 of the inlet channel 6, the pressure will be increased. The cavity 46 in the ring will be filled by the pressure working liquid through the first channel 16, which will move the valve ring 23 into the lower (left) position up to the stop position. By that the operation of the pick described in the first example of realization will be started.

The function of the safety circuit will be equally applied also by the penetration through the working subject. The working tool 4 will be stopped. The pick does not beat with no-load.

An advantage of the hydraulic picks according to the invention is a markedly increased working output following a high effectiveness reaching values of 90% and an increased strength of stroke induced by a multiply axial strength of the striking pin 3. By the new construction shape of the working tool 4 and by the way of its placement into a solid smooth monolithic body without holes, with a sleeve for an anchoring of the pick to the industrial machine through an adapter, the picks are designed for the heaviest conditions. The high speed of the switching of the striking pin 3 in the bottom position markedly decreases the impulse of slip-in strength. Small dimensions and the weight of the pick and a high resistance against damage allows the use of one size of pick for all industrial machines up to weight of 12.5 tons. The supporting housing 1 is just one rotary unit without screw connections and lateral holes.

The invention claimed is:

1. A hydraulic pick, comprising:

a monolithic supporting housing including:

a first portion and a second portion, a piston rod, a piston, a striking pin, a working tool, and an inlet and an outlet for supply of liquid, said piston rod and said piston being fixedly positioned in said supporting housing, a movable valve ring being provided on said piston rod, said striking pin being movably provided on said piston rod and slidingly received in a bushing, at least a portion of said piston rod being located within a portion of said striking pin, said piston rod having a pressure transformer's piston movably connected thereto, said working tool being provided in said second portion of said supporting housing, said working tool being slidingly received in at least one tool bushing, a gas chamber being defined between the supporting housing, the pressure transformer's piston, and the striking pin, a pressure transformer's cylinder and equalizing chamber being defined between the piston rod and the pressure transformer's piston, and a connecting channel being provided between the gas chamber and the equalizing chamber.

2. The hydraulic pick according to claim 1, wherein the striking pin comprises an annular body having an inner diameter corresponding to an outer diameter of the piston rod and provided with an inner relief which defines a substantially closed, hollow space between the striking pin and the piston rod, said substantially closed, hollow space being divided by the piston into a first chamber and a second chamber, and a safety chamber being created in a wall of the striking pin.

3. The hydraulic pick according to claim 2, wherein the piston rod has a portion with a reduced diameter in the area of said first chamber, and wherein the movable valve ring is carried by the piston rod, said movable valve ring having a length than is longer than the portion of the piston rod which has a reduced diameter, whereby a relatively closed cavity is defined by an inner relief of said movable valve ring and the piston rod.

4. The hydraulic pick according to claim 3, wherein the piston rod comprises a return duct, permanently connected with said first chamber by a return tap provided between the return duct and the surface of the piston rod, said piston rod further comprising an inlet channel, equipped by a first tap, a third tap and a fourth tap and by a lower cavity, said hydraulic pick further comprising a switching element, said switching element defining a small cavity, a middle cavity and an upper cavity, whereby the lower cavity is connected with a first channel with a cavity in a ring, the small cavity being connected with the surface of the piston rod in said first chamber, the fourth tap of said inlet channel being led into said middle cavity, and said upper cavity being connected with said third tap of said inlet channel and wherein a fifth channel and an upper nozzle are connected with the surface of said piston rod, on which is led also the first tap of the inlet channel, which is led into said pressure transformer's cylinder, with a fourth channel extending from the surface of said piston rod to the switching element and with a third channel extending within a space of the first chamber, with the second channel and the third channel being on one-side of said piston and said fourth channel and said fifth channel being on another side of said piston.

5. The hydraulic pick according to claim 4, wherein the switching element has a ring shape with a graded outer diameter and a graded inner diameter so that an effective surface of the switching element proximate to the working tool is bigger than an effective surface of the switching element distal from the working tool.

6. The hydraulic pick according to claim 1, wherein the bushing of the striking pin and the bushing of the working tool are made of a non-metal material, and are flexible, whereby the working tool and also the striking pin are spring-loaded in a lower position in said supporting housing.

7. The hydraulic pick according to claim 1, wherein the hydraulic pick is safely kept in a stop position by gas pressure from a single-shot that is led into a gas chamber.

8. The hydraulic pick according to claim 1, wherein the hydraulic pick is equipped with a safety circuit comprising a channel made from the surface of said piston rod to the inner space of said piston rod, said channel being connected with the inlet channel and with the return duct, with a movable carpel provided in the channel.

9. The hydraulic pick according to claim 4, wherein the hydraulic pick is equipped with a safety circuit made from a second tap, a safety chamber and the return tap, whereby the second tap is led from the surface of said piston rod into said inlet channel, said return tap is led from the surface of said piston rod into said return duct and said safety chamber is defined in an upper part of said striking pin from an inner side.

10. The hydraulic pick according to claim 3, wherein the piston rod comprises a return duct, permanently connected with said first chamber by a return tap provided between the return duct and the surface of the piston rod, said piston rod further comprising an inlet channel, equipped by a first tap, a third tap and a fourth tap and by a lower cavity, said hydraulic pick further comprising a switching element, said switching element defining a small cavity, a middle cavity and an upper cavity, whereby the lower cavity is connected with a first channel with a cavity in a ring, the small cavity being connected by a lower nozzle and by a second channel with the surface of the piston rod in said first chamber, the fourth tap of said inlet channel being led into said middle cavity, and said upper cavity being connected with said third tap of said inlet channel and wherein a fifth channel and an upper nozzle are connected with the surface of said piston rod, on which is led also the first tap of the inlet channel, which is led into said pressure transformer's cylinder, with a fourth channel extending within the second chamber from the surface of said piston rod to the switching element and with a third channel extending within a space of the first chamber, with the lower nozzle, the second channel and the third channel being on one-side of said piston and said fourth channel and said fifth channel being on another side of said piston.

11. The hydraulic pick according to claim 4, wherein the switching element has a ring shape with a graded outer diameter and a graded inner diameter so that an effective surface of the switching element proximate to the working tool is bigger than an effective surface of the switching element distal from the working tool, whereby a duct and a filling duct are created in the switching element.

* * * * *